Patented Nov. 19, 1946

2,411,275

UNITED STATES PATENT OFFICE 2,411,275

ORGANOPOLYSULFIDE RUBBER

Ivar H. Kinneberg and Charles L. Thomas, Riverside, Ill., assignors to Universal Oil Products Company, Chicago, Ill., a corporation of Delaware No Drawing. Application March 12, 1943, Serial No. 478,963

21 Claims. (Cl. 260—79)

This invention relates to a process for producing rubber-like material having elastic and tensile properties and other desirable characteristics similar to those of natural rubber.

An object of this invention is to produce synthetic rubber-like material from olefinic hydrocarbons and other organic compounds derived therefrom.

Another object is to produce synthetic rubber-like materials with not only high tensile strength and elasticity, but with good resistance to wear, oxidation, and hydrocarbon solvents.

In accordance with the present invention a rubber-like material is produced having high tensile strength, good elasticity, and other desirable characteristics of natural rubber by a series of reactions, in which propylene or a propane-propylene fraction and a diolefinic hydrocarbon, such as butadiene, are treated with sulfur monochloride, preferably in the presence of an alcohol or water, and the resultant mixture of $\beta,\beta'$-dichloro dipropyl sulfide and polychloro polyalkyl sulfide, the latter producible from the diolefinic hydrocarbon, is treated with an aqueous solution of a water-soluble polysulfide, such as sodium polysulfide, to form a rubber-like product.

One specific embodiment of the present invention relates to a process which comprises reacting propylene and a diolefin with sulfur monochloride to form a chloroalkyl sulfide mixture and treating said mixture with an aqueous solution of a water-soluble polysulfide to form a rubber-like material.

Propylene utilized as a starting material for the process of this invention may be obtained from any source including the catalytic dehydration of a propyl alcohol, the separation of a propane-propylene fraction from cracked gases, the catalytic or thermal dehydrogenation of propane to propylene, etc. It is not to be inferred that the different propylene-containing fractions mentioned above are necessarily equivalent to propylene of high purity resulting from catalytic dehydration of a propyl alcohol.

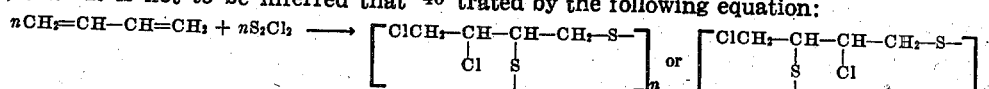

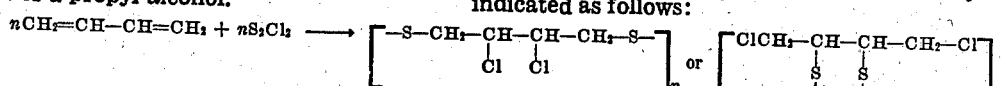

Diolefinic hydrocarbons employed in the process of the present invention may be obtained from any source, and comprise butadiene-1,3, isoprene, piperylene, and higher boiling diolefins, principally conjugated diolefinic hydrocarbons. Under some circumstances acetylenic hydrocarbons may be utilized similarly although not necessarily under the same conditions of operation.

Sulfur monochloride, which is generally represented by the formula $S_2Cl_2$, is producible by the action of chlorine on sulfur or of chlorine on a metal sulfide. As sulfur monochloride is now a commercial product, further details of its manufacture are not described herein.

The reaction of sulfur monochloride with propylene results in the formation of a dichloro dipropyl sulfide. The resultant product comprises essentially beta,beta'-dichloro di-n-propyl sulfide but may have one or more of the branched chain structures illustrated by the following formulae:

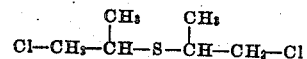

or

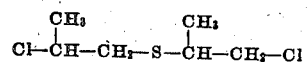

The reaction between propylene and sulfur monochloride apparently does not result in the formation of gamma,gamma'-dichloro-dipropyl sulfide which may be referred to as gamma, gamma'-dichloro-di n-propyl sulfide having the following structural formula:

$$Cl-CH_2-CH_2-CH_2-S-CH_2-CH_2-CH_2-Cl$$

Similar reaction of a diolefin such as butadiene-1,3 with sulfur monochloride results in the formation of polyhalo alkyl sulfides containing more than two chlorine atoms per molecule. This reaction involving first 1,4- and then 2,3-addition of sulfur monochloride to butadiene may be illustrated by the following equation:

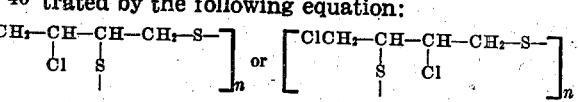

Similarly, simultaneous 1,2- and 3,4-addition reactions are also possible and lead to the production of other long chain materials which may be indicated as follows:

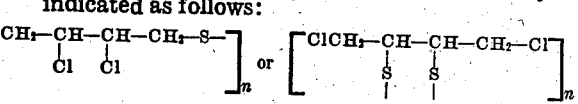

Long and interwoven chains of carbon and sulfur atoms may thus be formed, particularly when the propylene-diolefin mixture charged contains a relatively high proportion of the diolefinic material. In general such mixtures contain a higher molecular proportion of propylene than of diolefin. Mixed reaction products may be formed by substantially simultaneous reaction of propylene and diolefin with sulfur monochloride.

Unexpected results are obtained by treating the propylene-diolefin-sulfur monochloride reaction product with an aqueous solution of an alkali metal polysulfide in that the rubber-like material so produced is superior to that obtainable from similar treatment of dichloro dipropyl sulfide, the latter producible from propylene and sulfur monochloride. The presence of relatively small amounts of the diolefin-sulfur monochloride reaction product in admixture with dichloro dipropyl sulfide results in the formation of a rubber-like material having greater elasticity and toughness than possessed by that formed simply from condensation of dichloro di-propyl sulfide with sodium polysulfide.

The condensation of dichloro dipropyl sulfide with an inorganic polysulfide, such as sodium tetrasulfide, results in the formation of a long chain or linear polymer, the structural unit of which may be represented by the following formula:

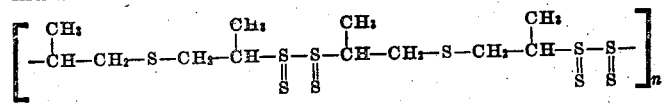

When dichloro dipropyl sulfide is condensed with sodium polysulfide under preferred conditions of operation which include a temperature of from about 30 to about 120° C. and in the presence of a dispersing agent such as freshly precipitated magnesium hydroxide, the resultant product is a somewhat plastic rubber-like material.

In accordance with the present invention, we propose to reduce the placticity and otherwise improve the other rubber-like properties of the above indicated reaction product by forming a mixture of dichloro dipropyl sulfide and a diolefin-sulfur monochloride reaction product which may be referred to as a polyhalo alkyl sulfide, and reacting said mixture with an aqueous solution of an inorganic polysulfide such as sodium polysulfide to form a latex-like suspension of a rubber-like material. The rubber-like material thus formed from propylene and butadiene (the latter being a typical diolefin), by the reactions herein described, may consist of long and interwoven chains of carbon and sulfur atoms. The structural unit of a long chain molecule of this type may be represented by the following formula:

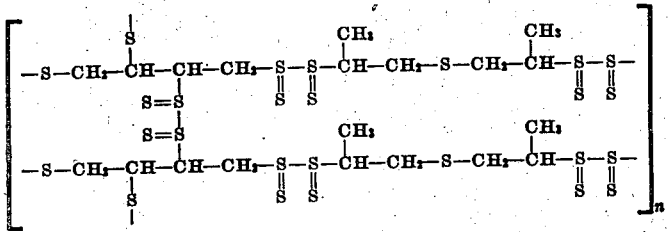

in which $n$ is the number of times the above indicated unit is present in the polymeric rubber-like material of high molecular weight. Because of the different possible ways in which sulfur monochloride may react with butadiene, the following structural formulae may represent other structural units which may be present in a rubber-like material formed by reacting propylene and butadiene with sulfur monochloride and condensing that reaction product with sodium polysulfide:

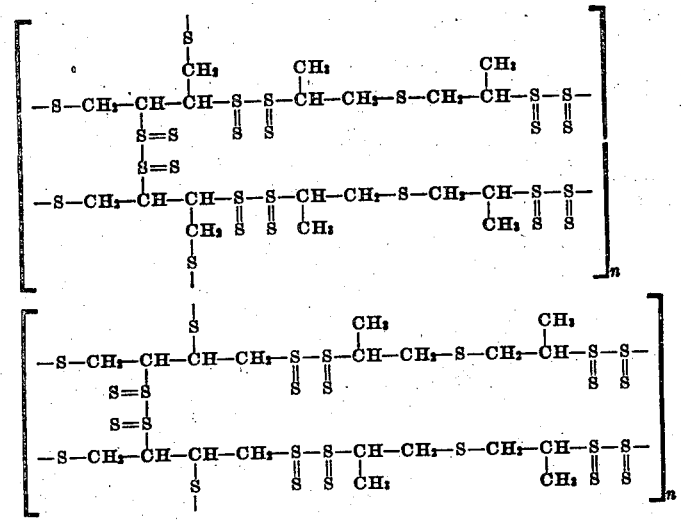

It is thus seen that the rubber-like material formed by the present process may be of exceedingly complex structure; and that said structure is dependent upon the proportions of propylene and diolefinic hydrocarbon charged to reaction with sulfur monochloride, the chemical reaction with sulfur monochloride, the chemical reactivity and structures of the products so formed, the nature of the water-soluble polysulfide employed, the temperature and pressure conditions utilized in the different steps of the process, and other factors.

In accordance with the process of the present invention, a hydrocarbon fraction containing propylene and a diolefin such as butadiene, generally in admixture with propane and butanes, is treated with sulfur monochloride at a temperature of from about 0° to about 150° C., but preferably at a temperature of from about 20° to about 60° C., under a pressure up to about 10 atmospheres in a reactor provided with good agitation or mixing. This reaction is generally carried out in the presence of a hydroxy compound of the class ROH in which R may be a hydrogen atom or an alkyl group. Such an addition of water or of an alcohol, the latter containing from 1 to about 5 or more carbon atoms per molecule, tends to promote a smooth reaction between propylene, diolefin, and sulfur monochloride to form relatively high yields of a desired chloroalkyl sulfide mixture. The presence of the hydroxy compound also promotes the separation of sulfur from the reaction product formed from a propylene-diolefin mixture undergoing reaction with sulfur monochloride. The amount of alcohol or water so employed is generally about 10 weight per cent of the sulfur monochloride charged.

The sulfur which is separable from the olefinic hydrocarbon-sulfur monochloride reaction product as hereinabove set forth is generally present therein in what may be termed a labile condition. It is not clear whether the labile sulfur is bound chemically in the chloroalkyl sulfide mixture or whether it is in solution. The amount of sulfur present in such labile condition is substantially equal to one-half of the total sulfur content derived from reaction of the olefinic hydrocarbons and sulfur monochloride. Also, while it is sometimes desirable to effect separation of labile sulfur from a chloroalkyl sulfide mixture before treating the latter with sodium polysulfide solution, it is not imperative to do so in order to produce a polyalkyl polysulfide rubber of good quality.

The charging stock containing the propylene-diolefin mixture is generally introduced gradually to the well stirred sulfur monochloride because care is needed to prevent the reaction temperature from becoming too high due to the exothermic nature of the reaction between the unsaturated hydrocarbons and sulfur monochloride. The hydrocarbon mixture containing propylene and a diolefin such as butadiene is sometimes introduced at such a rate that small amounts of these unsaturated hydrocarbons are not absorbed and escape from the reaction zone. The reaction product so formed from propylene, butadiene, and sulfur monochloride may be distilled at reduced pressure to separate the desired chloro alkyl sulfide mixture from relatively small amounts of higher boiling materials, or the total product itself may be employed in the next step of the process in which this product or the distilled chloroalkyl sulfide mixture is treated with an aqueous solution of a water-soluble inorganic polysulfide, such as sodium polysulfide, of which sodium tetrasulfide with the general formula $Na_2S_4$, is representative. Suitable polysulfides of sodium have the general formula $Na_2S_n$ in which $n$ is an integer of 2 to about 5, inclusive.

Although sodium polysulfide is the water-soluble polysulfide generally employed for treating the above mentioned chloroalkyl sulfide mixtures to form rubber-like materials, other inorganic polysulfides utilizable similarly, although not necessarily under the same conditions of operation, include alkaline earth polysulfides and particularly calcium polysulfides of the general formula $CaS_n$ or potassium polysulfides of the general formula $K_2S_n$ wherein $n$ may vary from 2 to about 5, inclusive, and polysulfides of basic nitrogen compounds, particularly ammonium polysulfides and tetraalkyl ammonium polysulfides.

The treatment of a mixture of dichloro dipropyl sulfide and a diolefin-sulfur monochloride reaction product with an inorganic polysulfide, such as sodium polysulfide, is generally carried out by slowly adding this chloroalkyl sulfide mixture to an aqueous solution of the sodium polysulfide containing a dispersing agent, such as magnesium hydroxide so as to effect substantially complete reaction between the dichloro dipropyl sulfide, the diolefin-sulfur monochloride reaction product, and the sodium polysulfide to form a latex-like suspension of a high molecular weight organic polysulfide. The condensation reaction with the sodium polysulfide solution is generally carried out at a temperature of from about 30° to about 120° C. As the alkali metal polysulfide is in aqueous solution and since this solution contains a dispersing agent, the chloroalkyl sulfide mixture is dispersed in the aqueous phase during this treatment and reacts to form a latex-like product or suspension of an organic polysulfide. The organic polysulfide product herein also referred to as a rubber and existing as a latex-like suspension may be washed with water by settling and decantation to remove substantially all water-soluble salts.

The resultant washed latex-like suspension which may contain upwards of 80% or better by weight of a rubber, may be treated with small amounts of an acid, generally a mineral acid such as hydrochloric acid, in order to coagulate the latex-like suspension and to form a coagulum of the rubber-like material which may be compounded in substantially the same manner as crude rubber with reinforcing pigments such as carbon black, fillers, plasticizers, and a vulcanization agent such as zinc oxide with or without sulfur and cured by heat and pressure. Alternatively, the latex-like suspension may be compounded by mixing before coagulation. The raw rubber-like synthetic material, produced and compounded in accordance with the process of the present invention, is suitable for use in the production of tires and many types of mechanical goods heretofore manufactured generally from natural rubber as well as in special applications where oil resistance not possessed by natural rubber is desired. It may also be compounded with natural rubber or hydrocarbon synthetic rubbers to impart oil resistance to them.

The latex-like dispersion obtained as hereinabove set forth may also be utilized as such for impregnating fabrics and other materials or it may be separated by means of a centrifuge into a more highly concentrated latex. The latex-like material so obtained by centrifugation may be utilized as a paint or lacquer for applying a rubber-like coating to metals, fabrics, and other materials.

The following results are given to illustrate the process of the invention, although with no intention of unduly limiting its generally broad scope.

When 17 grams of substantially pure 1,3-butadiene was vaporized into a bubbler containing 42 grams of sulfur monochloride at room temperature, the reaction mixture becomes hot, darkened in color, and hydrogen chloride was evolved. The reaction mixture also became so viscous that no more butadiene could be introduced thereto by the method employed.

In another run, substantially pure 1,3-butadiene, dried by passage through calcium chloride, was passed at a rate of about 2.5 cubic feet per hour through a bubbler containing methanol at 0° C. The resultant mixture of 1,3-butadiene and methanol vapors was then reacted with 375 grams of well agitated sulfur monochloride contained in a reactor cooled by a water-bath so that the reaction temperature was not permitted to exceed 35° C. The sulfur monochloride was thus converted into reaction products over a period of about 4 hours during which about 6.5 grams of methanol was vaporized. Within 2 hours after the start of the experiment, the reaction product had become so viscous as to require the addition thereto of 320 grams of carbon tetrachloride diluent. The reaction product dissolved completely in the carbon tetrachloride forming a light brown colored solution with no deposition of sulfur or loss of hydrogen chloride. This yield of butadiene-sulfur monochloride reaction product was 98% of the theoretical based upon the sulfur monochloride which reacted with an equimolecular quantity of butadiene.

In a third run, sulfur monochloride was similarly reacted with a mixture containing 73 mole per cent of propylene, 3.0% propane, 1.1% butylenes, 22.1% 1,3-butadiene, and 0.8% pentanes and higher hydrocarbons. This gas mixture which was dried by calcium chloride was passed at a rate of 2 cubic feet per hour through a bubbler containing methanol at 10° C. and was then introduced to a reactor containing 382 grams of sulfur monochloride which was rapidly agitated and maintained at a temperature of from 45 to 50° C. A total of 24.2 grams of methanol was so introduced with the propylene-butadiene mixture charged.

The reaction appeared to be complete in about 3 hours but the charging of the propylene-butadiene mixture was continued for a total time of 4.5 hours in order to insure complete reaction of all of the sulfur monochloride. The reaction product was a clear oily amber colored liquid with a density of 1.25 at 20° C. There was no loss of hydrogen chloride from the reaction product and it contained no precipitated sulfur. The yield of reaction product was 599 grams which corresponded to 98% of the theoretical upon the basis of the quantity of sulfur monochloride charged together with the assumption that 2 molecular proportions of sulfur monochloride reacted with 1 molecular proportion of butadiene plus 2 molecular proportions of propylene. This clear, amber colored liquid was substantially saturated as evidenced by a bromine number of 3.7.

The product so obtained from propylene, butadiene, and sulfur monochloride was reacted with an aqueous sodium tetrasulfide solution prepared by dissolving technical sodium sulfide with sulfur in boiling water. In this condensation treatment 0.43 molecular proportion (72 cc.) of the propylene-butadiene-sulfur monochloride reaction product (without further purification) was added slowly with vigorous stirring to 0.5 molecular proportion (275 cc.) of the aqueous sodium tetrasulfide solution containing approximately 5 grams of freshly precipitated magnesium hydroxide employed as a dispersing agent. The condensation took place at 60° to 85° C. over a period of 6 hours with a practically quantitative yield of product which was obtained as a finely divided and slowly settling suspension. This suspension of reaction product was washed by decantation with tap water until substantially free from soluble salts. The resultant washed suspension, which was pale yellow in color, was coagulated by acidification with dilute hydrochloric acid. The coagulum so obtained was dried by working in a warm mill whereby a brown rough sheeted material was obtained which resembled soft gum rubber. The brown sheeted material was suitable for compounding with reinforcing and vulcanizing agents such as carbon black and zinc oxide, respectively.

The character of the present invention and type of results obtained are evident from the preceding specification and example, although they are not to be considered as imposing undue limitations upon its generally broad scope.

We claim as our invention:

1. A process which comprises reacting propylene and a conjugated diolefin with sulfur monochloride to form a mixture of chloroalkyl sulfides and treating said mixture with an aqueous solution of a water-soluble polysulfide.

2. A process for producing an elastomer which comprises reacting propylene and a conjugated diolefin with sulfur monochloride to form a mixture of chloroalkyl sulfides, treating said mixture with an aqueous solution of a water-soluble polysulfide in the presence of a dispersing agent to form a dispersion of organic polysulfides, washing said dispersion with water until substantially free from water-soluble salts, and treating the washed dispersion with an acid to form a coagulum.

3. A process for producing an elastomer which comprises reacting propylene and a conjugated diolefin with sulfur monochloride in the presence of a hydroxy compound selected from the group consisting of a monohydric alcohol and water to form a mixture of chloroalkyl sulfides and treating said mixture with an aqueous solution of a water-soluble polysulfide.

4. A process for producing an elastomer which comprises reacting propylene and a conjugated diolefin with sulfur monochloride in the presence of a hydroxy compound selected from the group consisting of a monohydric alcohol and water to form a mixture of chloroalkyl sulfides, treating said mixture with an aqueous solution of a water-soluble polysulfide in the presence of a dispersing agent to form a dispersion of organic polysulfides, washing said dispersion with water until substantially free from water-soluble salts, treating the washed dispersion with an acid to form a coagulum, and subjecting said coagulum to drying treatment.

5. A process for producing an elastomer which comprises reacting propylene and butadiene 1,3 with sulfur monochloride at a temperature of from about 0° to about 150° C. to form a mixture of chloroalkyl sulfides, treating said mixture with an aqueous solution of a water-soluble polysulfide at a temperature of from about 30° to about 120° C. in the presence of a dispersing agent to form a dispersion of organic polysulfides, washing said dispersion with water until substantially free from water-soluble salts, and treating the washed dispersion with an acid to form a coagulum.

6. A process for producing an elastomer which comprises reacting propylene and a conjugated diolefin with sulfur monochloride in the presence of a hydroxy compound selected from the group consisting of a monohydric alcohol and water to form a mixture of chloroalkyl sulfides, treating said mixture with an aqueous solution of a water-soluble polysulfide in the presence of a dispersing agent to form a dispersion of organic polysulfides, washing said dispersion with water until substantially free from water-soluble salts, treating the washed dispersion with an acid to form a coagulum, and subjecting said coagulum to drying, compounding, and curing treatments to produce the elastomer.

7. A process for producing an elastomer which comprises reacting propylene and butadiene 1,3 with sulfur monochloride in the presence of a hydroxy compound selected from the group consisting of a monohydric alcohol and water to form a mixture of chloroalkyl sulfides, treating said mixture with an aqueous solution of a water-soluble polysulfide in the presence of a dispersing agent to form a dispersion of organic polysulfides, washing said dispersion with water until substantially free from water-soluble salts, treating the washed dispersion with an acid to form a coagulum, and subjecting said coagulum to drying, compounding, and curing treatments to produce the elastomer.

8. A process for producing an elastomer which comprises reacting propylene and butadiene 1,3 with sulfur monochloride at a temperature of from about 0° to about 150° C. in the presence of a hydroxy compound selected from the group consisting of a monohydric alcohol and water to form a mixture of chloroalkyl sulfides, treating said mixture with an aqueous solution of a water-soluble polysulfide at a temperature of from about 30° to about 120° C. in the presence of a dispersing agent comprising magnesium hydroxide to form a dispersion of organic polysulfides, washing said dispersion with water until substantially free from water-soluble salts, treating the washed dispersion with an acid to form a coagulum, and subjecting said coagulum to drying to produce the elastomer.

9. A process which comprises reacting propylene and a conjugated diolefin with sulfur monochloride to form a mixture of chloroalkyl sulfides and treating said mixture with an aqueous solution of a polysulfide of an alkali metal.

10. A process for producing an elastomer which comprises reacting propylene and a conjugated diolefin with sulfur monochloride in the presence of a hydroxy compound selected from the group consisting of a monohydric alcohol and water to form a mixture of chloroalkyl sulfides, treating said mixture with an aqueous solution of a polysulfide of an alkali metal in the presence of a dispersing agent to form a dispersion of organic polysulfides, washing said dispersion with water until substantially free from water-soluble salts, treating the washed dispersion with an acid to form a coagulum, and subjecting said coagulum to drying, compounding, and curing treatments to produce the elastomer.

11. A process for producing an elastomer which comprises reacting propylene and butadiene 1,3 with sulfur monochloride in the presence of a hydroxy compound selected from the group consisting of a monohydric alcohol and water to form a mixture of chloroalkyl sulfides, treating said mixture with an aqueous solution of a polysulfide of an alkali metal in the presence of a dispersing agent to form a dispersion of organic polysulfides, washing said dispersion with water until substantially free from water-soluble salts, treating the washed dispersion with an acid to form a coagulum, and subjecting said coagulum to drying, compounding, and curing treatments to produce the elastomer.

12. A process for producing an elastomer which comprises reacting propylene and butadiene 1,3 with sulfur monochloride in the presence of a hydroxy compound selected from the group consisting of a monohydric alcohol and water to form a mixture of chloroalkyl sulfides, treating said mixture with an aqueous solution of a polysulfide of an alkali metal in the presence of a dispersing agent comprising magnesium hydroxide to form a dispersion of organic polysulfides, washing said dispersion with water until substantially free from water-soluble salts, treating the washed dispersion with an acid to form a coagulum, and subjecting said coagulum to drying, compounding, and curing treatments to produce the elastomer.

13. A process for producing an elastomer which comprises reacting propylene and butadiene 1,3 with sulfur monochloride in the presence of a hydroxy compound selected from the group consisting of a monohydric alcohol and water to form a mixture of chloroalkyl sulfides, treating said mixture with an aqueous solution of sodium polysulfide in the presence of a dispersing agent to form a dispersion of organic polysulfides, washing said dispersion with water until substantially free from water-soluble salts, treating the washed dispersion with an acid to form a rubber-like coagulum, and subjecting said coagulum to drying and curing treatments to produce the elastomer.

14. A process for producing an elastomer which comprises reacting propylene and butadiene 1,3 with sulfur monochloride at a temperature of from about 0° to about 150° C. in the presence of a hydroxy compound selected from the group consisting of a monohydric alcohol and water to form a mixture of chloroalkyl sulfides, treating said mixture with an aqueous solution of sodium polysulfide at a temperature of from about 30° to about 120° C. in the presence of a dispersing agent comprising magnesium hydroxide to form a dispersion of an organic polysulfide, washing said dispersion with water until substantially free from water-soluble salts, treating said washed dispersion with an acid to form a coagulum, and subjecting said coagulum to drying, compounding, and curing treatments to produce the elastomer.

15. A process which comprises reacting propylene and a conjugated diolefin with sulfur monochloride to form a mixture of chloroalkyl sulfides and treating said mixture with an aqueous solution of a polysulfide of an alkaline earth metal.

16. The process of claim 4 further characterized in that said water-soluble polysulfide comprises a polysulfide of an alkali metal.

17. The process of claim 4 further characterized in that said water-soluble polysulfide comprises a polysulfide of an alkaline earth metal.

18. An elastomer formed by the process of claim 4.

19. An elastomer formed by the process of claim 8.

20. The process defined in claim 1 further characterized in that the water-soluble polysulfide comprises a polysulfide of an alkali metal.

21. The process defined in claim 1 further characterized in that the water-soluble polysulfide comprises a polysulfide of an alkaline earth metal.

IVAR H. KINNEBERG.
CHARLES L. THOMAS.